United States Patent [19]

Holz

[11] 3,950,220

[45] Apr. 13, 1976

[54] INTERNAL PRIMARY RECIRCULATING PUMP FOR BOILING WATER REACTORS

[75] Inventor: Hans Holz, Frankenthal, Germany

[73] Assignee: Klein, Schanzlin & Becker Aktiengesellschaft, Frankenthal (Pfalz), Germany

[22] Filed: Mar. 23, 1973

[21] Appl. No.: 344,368

[52] U.S. Cl. .................................... 176/65; 417/323

[51] Int. Cl.[2] .......................................... G21C 15/00

[58] Field of Search ............... 176/65; 417/323, 368

[56] References Cited

UNITED STATES PATENTS

| | | | |
|---|---|---|---|
| 879,059 | 2/1908 | Ludewig | 417/323 |
| 1,988,163 | 1/1935 | Church | 417/323 |
| 3,467,578 | 9/1969 | Kornbichler et al. | 176/65 |

FOREIGN PATENTS OR APPLICATIONS

| | | | |
|---|---|---|---|
| 1,067,081 | 5/1967 | United Kingdom | 176/65 |

*Primary Examiner*—Samuel Feinberg
*Attorney, Agent, or Firm*—Michael J. Striker

[57] ABSTRACT

The pressure vessel of a boiling water reactor has several openings, one for each of a set of internal primary recirculating pumps. The body of each pump extends into the respective opening and is provided with a ring-shaped chamber which receives feed water and surrounds the pump shaft which is driven by a normal, wet or canned electric motor. The shaft carries a single-stage or multi-stage turbine which is located upstream of the pump rotor and serves to prolong the deceleration of the pump rotor to zero speed in the event of unintentional motor stoppage due to current failure. The pressure chambers of the turbine and pump rotor communicate with each other by way of an annular flow restricting bypass.

8 Claims, 1 Drawing Figure

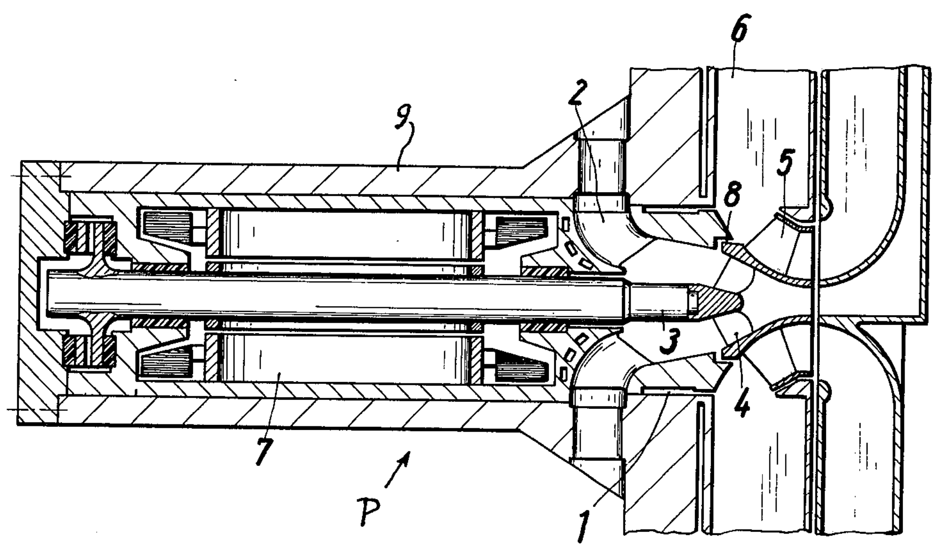
6
2
9
5
8
3
4
7
P
1

INTERNAL PRIMARY RECIRCULATING PUMP FOR BOILING WATER REACTORS

BACKGROUND OF THE INVENTION

The present invention relates to recirculating pumps for nuclear reactors in general, and more particularly to improvements in internal primary pumps for recirculation of coolant in pressure vessels of boiling water reactors.

It is already known to provide in a nuclear reactor plant a battery of internal recirculating pumps which extend into the bottom wall of the pressure vessel in a boiling water reactor. Such recirculating pumps are installed independently of the feed water supply lines and are driven by normal electric motors or by so-called wet or canned motors known from the art of glandless recirculating pumps. A drawback of such constructions is that the pressure vessel of the reactor must be provided with several sets of openings, namely, those for the introduction of portions of internal recirculating pumps and those for the admission of feed water. Moreover, conventional glandless recirculating pumps constitute expensive auxiliary aggregates especially since, for the reasons of safety, each such pump normally embodies a motor generator with flywheel for supplying additional energy in order to prolong the period of deceleration of the pump rotor in the event of current failure. Gradual deceleration is desirable and necessary in order to insure satisfactory cooling of the pressure vessel. In the absence of aforementioned generators, the rotor of the pump would be arrested practically immediately upon opening of the motor circuit.

It was already proposed to employ in a boiling water reactor one or more internal recirculating pumps which are driven by water turbines and are mounted in such a way that feed water enters the pressure vessel by way of openings which are provided for introduction of portions of internal recirculating pumps. Reference may be had to German Offenlegungsschrift No. 1,921,903. This renders it possible to reduce the number of openings in the pressure vessel and the number of conduits for admission of feed water. However, such pressure vessels must be equipped with bypass lines. Another drawback of the just described recirculating systems is that the regulation of water turbines is extremely complex, mainly because the blades of the turbine are not readily accessible for adjustment of their angles.

SUMMARY OF THE INVENTION

An object of the invention is to provide the pressure vessel of a reactor, especially the pressure vessel of a boiling water reactor, with one or more novel and improved internal primary recirculating pumps which can be installed in openings for the admission of feed water and whose parts are more readily accessible than in heretofore known pressure vessels.

Another object of the invention is to provide a novel and improved internal primary recirculating pump for use in the pressure vessel of a boiling water reactor.

A further object of the invention is to provide an internal recirculating pump with novel and improved means for prolonging the interval of deceleration upon opening of the circuit of the pump motor.

An additional object of the invention is to provide an internal recirculating pump with a novel and improved turbine.

The invention is embodied in a nuclear reactor, particularly in a boiling water reactor, which comprises a pressure vessel having one or more openings for admission of feed water and an internal primary recirculating pump for each such opening. Each pump comprises a body a portion of which extends into the respective opening and is formed with an annular chamber for admission of feed water, a shaft which is rotatably mounted in the body and extends into the opening, a rotor which is directly or indirectly carried by the shaft in close proximity to the annular chamber and normally receives torque from the shaft to convey feed water from the annular opening into the pressure vessel, an electric motor mounted in the body and arranged to drive the shaft, and a single-stage or multi-stage turbine, mounted on the shaft, preferably at the suction side of the rotor, to prolong the deceleration of the rotor to zero speed and to thus lengthen the interval of cooling in the event of failure of current supply to the motor. The turbine may serve as a carrier for the pump rotor, and the pressure chamber of the turbine is preferably in communication with the pressure chamber of the rotor by way of an annular flow-restricting bypass which is defined by the pump body and the rotor.

The novel features which are considered as characteristic of the invention are set forth in particular in the appended claims. The improved recirculating pump itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary sectional view of a pressure vessel in a boiling water reactor and an axial sectional view of an internal primary recirculating pump which embodies the invention.

DESCRIPTION OF THE PREFERRED EMBODIMENTS

The drawing illustrates a portion of the pressure vessel 6 in a boiling water reactor. The vessel 6 (e.g., the bottom wall of the vessel) has an opening 1 which is provided therein for the purpose of installing a novel internal primary recirculating pump P. In addition, the opening 1 simultaneously serves for admission of feed water by way of an annular chamber 2 in the body 9 of the pump P. The chamber 2 is closely adjacent to the rotor 5 of the pump P. Prior to entering the pressure vessel 6, the stream of feed water flows from the annular chamber 2 between the blades of the wheel 4 of a single stage turbine which is mounted on the pump shaft 3, preferably at the suction side of the rotor 5. The shaft 3 is driven by an electric motor 7 which is mounted in the body 9 of the pump P. In the illustrated embodiment, the turbine wheel 4 serves as a carrier for the pump rotor 5.

When the supply of current to the motor 7 is interrupted due to an unforeseen failure, the turbine wheel 4 prevents rapid deceleration of the shaft 3 to zero speed to thus insure that the cooling of the boiling water reactor proceeds for a sufficient interval of time.

A bypass channel 8 between the pressure chambers of the turbine and pump rotor is preferably formed as a slightly enlarged sealing gap and serves to prevent an overheating of the turbine under certain operating conditions. If desired, the illustrated single-stage turbine can be replaced with a multi-stage turbine.

The turbine replaces costly, bulky and complex motor generator sets which are used in conventional boiling water reactors to insure the supply of additional energy in the event of current failure. The turbine insures that the circulation of feed water in the pressure vessel 6 continues even if the motor 7 is disconnected from the energy source. Moreover, and as long as the quantity of feed water which is being admitted to the chamber 2 remains substantially unchanged, the turbine including the wheel 4 (or a multi-stage turbine) is capable of insuring that the pump P remains in operation at a reduced RPM.

The cold feed water which is admitted by way of the chamber 2 is caused to mix with hot reactor water upstream of the pump rotor 5. This produces a desirable supercooling affect and a substantial NPSH gain.

The motor 7 may be a normal electric motor or a wet or canned motor.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

I claim:

1. In a nuclear reactor, particularly in a boiling water reactor, a combination comprising a pressure vessel having an opening; and an internal recirculation pump having a body a portion of which extends into said opening and is provided with an annular chamber for reception of feed water, a shaft rotatably mounted in said body and extending into said opening, a turbine mounted on said shaft in the path of flow of feed water from said chamber into said pressure vessel, a pump rotor supported by and surrounding said turbine for circulating said feed water in said vessel, and an electric motor supported by said body and arranged to drive said shaft, whereby said turbine prolongs the interval of deceleration of said rotor to zero speed in the event of failure of current supply to said motor.

2. A combination as defined in claim 1, wherein said turbine is mounted on said shaft at the suction side of said rotor.

3. A combination as defined in claim 1, wherein said turbine is a multi-stage turbine.

4. A combination as defined in claim 1, wherein said motor is a wet motor.

5. A combination as defined in claim 1, wherein said motor is a canned motor.

6. A combination as defined in claim 1, wherein said pressure vessel has a bottom wall and said opening is provided in said bottom wall.

7. In a nuclear reactor, particularly a boiling water reactor, a combination comprising a pressure vessel having an opening; and an internal recirculating pump having a body a portion of which extends into said opening and is provided with an annular chamber for reception of feed water, a shaft rotatably mounted in said body extending into said opening, a rotor carried by said shaft in close proximity of said chamber, an electric motor supported by said body and arranged to drive said shaft so that said rotor normally induces a flow of feed water from said chamber into said vessel, a turbine mounted on said shaft and arranged to prolong the interval of deceleration of said rotor to zero speed in the event of failure of current supply to said motor, said body being further provided with a first pressure chamber for said turbine, a second pressure chamber for said rotor, and a bypass connecting said pressure chambers.

8. A combination as defined in claim 7, wherein said bypass is a ring-shaped flow-restricting channel.

* * * * *